US005178797A

United States Patent [19]

Evans

[11] Patent Number: 5,178,797

[45] **Date of Patent: * Jan. 12, 1993**

[54] CONDUCTIVE POLYMER COMPOSITIONS HAVING IMPROVED PROPERTIES UNDER ELECTRICAL STRESS

[75] Inventor: Joseph H. Evans, Palo Alto, Calif.

[73] Assignee: Raychem Corporation, Menlo Park, Calif.

[ * ] Notice: The portion of the term of this patent subsequent to Sep. 17, 2008 has been disclaimed.

[21] Appl. No.: 757,156

[22] Filed: Sep. 16, 1991

Related U.S. Application Data

[63] Continuation of Ser. No. 617,444, Nov. 21, 1990, Pat. No. 5,049,850, which is a continuation of Ser. No. 141,989, Apr. 21, 1980, abandoned.

[51] Int. Cl.[5] .................................... C08K 3/04

[52] U.S. Cl. .................................... 252/508; 252/510

[58] Field of Search ............... 252/508, 509, 510, 511, 252/518

[56] References Cited

U.S. PATENT DOCUMENTS

| | | | |
|---|---|---|---|
| 3,861,029 | 9/1975 | Smith-Johannsen | 252/571 |
| 3,976,608 | 8/1976 | Meyer | 252/571 |
| 4,151,126 | 4/1979 | Adelman et al. | 252/508 |
| 4,237,441 | 12/1980 | van Konynenburg | 338/22 R |
| 4,534,889 | 8/1985 | van Konynenburg et al. | 252/571 |
| 5,049,850 | 9/1991 | Evans | 338/22 R |

FOREIGN PATENT DOCUMENTS

| | | |
|---|---|---|
| 1207401 | 2/1960 | France . |
| 5114690 | 8/1970 | Japan . |
| 5136876 | 12/1972 | Japan . |
| 51-79140 | 9/1976 | Japan . |
| 831490 | 3/1960 | United Kingdom . |
| 1041503 | 9/1966 | United Kingdom . |
| 1185473 | 3/1970 | United Kingdom . |
| 1369210 | 10/1974 | United Kingdom . |
| 1444722 | 8/1976 | United Kingdom . |
| 1549757 | 8/1979 | United Kingdom . |
| 2018780 | 10/1979 | United Kingdom . |
| 2036754 | 7/1980 | United Kingdom . |

*Primary Examiner*—Karl Group
*Assistant Examiner*—Chris Gallo
*Attorney, Agent, or Firm*—Timothy H. P. Richardson; Marguerite E. Gerstner; Herbert G. Burkard

[57] ABSTRACT

Conductive polymer compositions comprise carbon black or graphite dispersed in a polymer and further comprise an arc-controlling additive such as alumina hydrate. Such compositions have improved performance when subjected to electrical stress and are, therefore, particularly useful in circuit protection devices.

20 Claims, No Drawings

CONDUCTIVE POLYMER COMPOSITIONS HAVING IMPROVED PROPERTIES UNDER ELECTRICAL STRESS

CROSS REFERENCE TO RELATED APPLICATIONS

This application is a continuation of copending commonly assigned application Ser. No. 07/617,444 filed Nov. 21, 1990, now U.S. Pat. No. 5,049,850 which is a file wrapper continuation of application Ser. No. 06/141,989 filed Apr. 21, 1980, now abandoned.

BACKGROUND OF THE INVENTION

1. Field of the Invention

This invention relates to conductive polymer compositions and electrical devices containing them.

2. Summary of the Prior Art

Conductive polymer compositions comprising carbon black dispersed in a polymer are known. Depending on the polymer and the carbon black and the relative amounts thereof, the compositions may have room temperature resistivities ranging from less than 1 ohm. cm to $10^8$ ohm.cm or more, and may exhibit positive temperature coefficent (PTC) behavior, zero temperature coefficient (ZTC or constant wattage) behavior or negative temperature coefficient (NTC) behavior. The major uses for conductive polymer compositions are in the shielding of cables and the inhibition of electrostatic charges, but the compositions can also be used in electrical devices in which current passes through an element composed of the composition, e.g. in heaters and current-limiting devices. Compositions useful in electrical devices generally have different properties from compositions useful in shielding and electrostatic applications. Reference may be made, for example, to U.S. Pat. Nos. 3,823,217 (Kampe), 3,861,029 (Smith-Johannsen et al.), 3,950,604 (Penneck), and 4,177,376 (Horsma et al.) and to U.S. patent application Ser. Nos. 904,736 (Penneck et al.), now abandoned, 732,792 (Van Konynenburg et al.), now abandoned, 751,095 (Toy et al.), now abandoned, 798,154 (Horsma), 965,343 (Van Konynenburg et al.), 965,344 now U.S. Pat. No. 4,237,441 (Middleman et al.), 965,345 now U.S. Pat. No. 4,242,573 (Middleman et al.), 6,773 now U.S. Pat. No. 4,255,698 (Simon) and 75,413 now U.S. Pat. No. 4,304,987 (Van Konynenburg). The disclosures of these patents and applications are incorporated by reference herein.

SUMMARY OF THE INVENTION

In recent research into the use of circuit protection devices containing PTC conductive polymer elements, it was observed that previously proposed devices (e.g. those described in application Ser. No. 965,344) failed to give repeated and effective protection against fault conditions in which the device was subjected to a combination of high current and high voltage. Reference should be made in this connection to the application of Middleman et al filed contemporaneously with this application and entitled "Circuit Protection Devices", Ser. No. 141,987 now U.S. Pat. No. 4,413,301 the disclosure of which is incorporated by reference herein. I have found that the performance, under conditions of high electrical stress, of conductive polymer compositions containing carbon black or graphite as the sole conductive filler, can be markedly improved by adding to such compositions one or more of the additives which have previously been used to improve the tracking resistance of polymeric insulating compositions. Although it is not entirely clear precisely why such additives have this valuable effect, they are referred to herein as arc-controlling additives. It is thought that their efficacy is probably due, at least in part, to their ability to extinguish arcs after they have been formed, but the additives may also act to reduce the susceptibility of the composition to form arcs in the first place. In any event, it is to be noted that the prior use of these additives, which has been to extinguish arcs on the contaminated surface of an electrical insulator, involves a very different situation from the present one, where the additives are effective in controlling arcs within a mass of conductive polymer (as well as at the surface thereof).

In one aspect, the invention provides a conductive polymer composition which has a resistivity at 23° C. of less than $10^6$ ohm. cm and which comprises (a) a polymer component which is present in amount 20 to 91% by volume of the composition;

(b) a conductive filler component which consists essentially of carbon black or graphite or a mixture of carbon black and graphite, which is dispersed in said polymer component and which is present in amount 4 to 65% by volume of the composition; and (c) an arc-controlling additive which is distributed in said polymer component and which is effective in reducing the susceptibility of the composition to damage when subjected to electrical stress sufficient to cause arcing in the absence of said additive.

In another aspect the invention provides an electrical device which comprises:

(a) an element composed of a conductive polymer composition as defined above, and (b) at least two electrodes which can be connected to a source of electrical power and which, when so connected, cause current to flow through said element.

DETAILED DESCRIPTION OF THE INVENTION

The compositions of the invention may exhibit PTC, ZTC, or NTC behavior; for example any of the compositions disclosed in the prior art and the earlier applications referred to above may be modified by the inclusion of at least one arc-controlling additive. The invention is especially valuable in relation to PTC compositions, particularly those having low resistivities at 23° C., e.g. below 20 ohm. cm, preferably below 10 ohm. cm, especially below 2 ohm. cm, which are useful in circuit protection devices.

The preferred arc-controlling additives for use in the present invention are particulate materials, particularly inorganic materials, especially hydrated inorganic materials. Particularly good results have been obtained using alumina trihydrate, $Al_2O_3.3H_2O$. Other inorganic materials include magnesia hydrate, magnesia and alumina.

The conductive filler and the arc-controlling additive preferably have a total surface area of at least 1800, especially at least 3,000, particularly at least 4,000 $m^2/100$ cc of composition, with higher values, e.g. at least 8,000 $m^2/100$ cc at lease 10,000 $m^2/100$ cc and at least 12,000 $m^2/100$ cc being particularly preferred.

The composition should contain an effective amount of the arc-controlling additive, typically 5 to 65%, preferably 10 to 35%, by volume of the composition.

The composition can also contain further additives which are known to enhance the effectiveness of anti-tracking additives in insulating compositions. Examples of such additives include the phosphorus-containing compounds disclosed in U.S. Pat. No. 4,100,089 and U.S. patent application Ser. Nos. 869,244, now U.S. Pat. No. 4,219,607 and 869,268 now U.S. Pat. No. 4,223,071 and 869,269 U.S. Pat. No. 4,198,310, and the oxides of elements of the transition series, lanthanide series or non-transuranic actinide series disclosed in British Patents Nos 1337951 and 1337952 and U.S. application Ser. No. 434,126, now abandoned especially $Fe_2O_3$; the disclosures of each of these patents and applications is incorporated herein by reference.

The conductive filler in the composition preferably consists essentially of at least one carbon black. The carbon black is selected with a view to the electrical characteristics desired in the composition, as taught by the various patents and applications referred to above. Thus for low resistivity PTC compositions, the carbon black preferably has a particle size, D, which is from 20 to 150 millimicrons and a surface area, S in $m^2/g$ such that S/D is not more than 10 (See Ser. No. 965,343 now U.S. Pat. No. 4,237,444. When using such a carbon black, preferably the quantity $$\frac{S}{D} \times \frac{\text{(volume of conductive filler + volume of arc-controlling additive)}}{\text{volume of polymer component}}$$

is less than 1.

The polymer component in the composition, which may comprise one or more polymers, preferably has a crystallinity of at least 1%, especially at least 5%, particularly at least 10%. Preferably the polymer component consists essentially of one or more crystalline polymers selected from polyolefins and copolymers of at least one olefin and at least one polar comonomer copolymerisable therewith, e.g. polyethylene or polypropylene. Other suitable polymers are referred to in the patents and applications referred to above.

The composition may be substantially free of cross-linking or may be cross-linked, e.g. to a gel fraction of at least 0.4 or 0.6. For some purposes, compositions free of cross-linking are preferred, because the presence of cross-linking tends to increase the likelihood of formation of carbonaceous conductive paths when arcing takes place.

The composition can be prepared by dispersing the carbon black or graphite, the arc-controlling additive and any other additives in the polymer component in any suitable way. The composition can be shaped by molding or extrusion or another melt-shaping technique into an element of the desired shape, any cross-linking thereof being carried out after such shaping.

The invention is illustrated by the following Examples.

EXAMPLE 1

The ingredients and amounts thereof given in the Table 1 below were used in this Example.

TABLE 1

| | MASTERBATCH | | | FINAL MIX | | |
|---|---|---|---|---|---|---|
| | g | wt % | vol % | g | wt % | vol % |
| Carbon Black (Furnex N765) | 1444 | 46.9 | 32.2 | 1143.9 | 33.8 | 26.9 |
| Polyethylene (Marlex 6003) | 1572 | 51.1 | 65.4 | 1246.3 | 36.8 | 54.7 |
| Filler (Hydral 705) | — | — | — | 948 | 28.0 | 16.5 |
| Antioxidant | 62 | 2.0 | 2.3 | 48.8 | 1.4 | 1.9 |

NOTES:
Furnex N765 (available from City Services Co) has a particle size (D) of 60 millimicrons, a density of 1.8 g/cc, and a surface area (s) of 32 $m^2/g$.
Marlex 6003 is a high density polyethylene with a melt index of 0.3 which is available from Phillips Petroleum Co.
The antioxidant used was an oligomer of 4,4-thio bis (3-methyl-6-t-butyl phenol) with an average degree of polymerization of 3–4, as described in U.S. Pat. No. 3,986,981.
Hydral 705 is alumina trihydrate.

The ingredients for the master batch were dry blended and then mixed for 8 minutes in a Banbury mixer turning at high gear. The mixture was dumped, cooled and granulated. The final mix was prepared by dry blending 948 g of the Hydral 705 with 2439 g. of the master batch mixture, and then mixing the dry blend for 4–5 minutes in a Banbury mixer turning at high gear. The mixture was dumped, cooled, granulated and dried (at 70° C., 1 Torr for 16 hours).

The granulated final mix was melt extruded in the form of a strip about 0.5 inch wide and about 0.105 inch thick, using a cross-head die, around a pair of pre-heated 20 AWG 19/32 stranded nickel-plated copper wires whose centers were 0.239 inch apart. The extruded product was cut into 1 inch lengths, and the polymeric composition removed from half of each length to produce a circuit control device as shown in FIG. 4 of the contemporaneously filed Middleman et al application referred to above.

EXAMPLES 2–4

The ingredients used in these Examples and the amounts thereof are shown in Table 2 below. The antioxidant is as specified in Table 1. Sterling NS and Sterling SO are available from Cabot, Hydral 705 from Alcan, Maglite D from Merck, and Kadox 15 from Gulf and Western, and they have the following properties

| | Material | Particle Size millimicrons | Density g/cc | Surface Area $m^2g$ |
|---|---|---|---|---|
| Sterling NS | Carbon black (N774) | 75 | 1.8 | 25 |
| Sterling SO | Carbon Black (N550) | 41 | 1.8 | 42 |
| Hydral 705 | $Al_2O_3\ 3H_2O$ | 0.5–2,000 | 2.42 | 12–15 |
| Maglite D | MgO | <44 | 3.32 | — |
| | | 130 | 5.52–6.52 | 8.5 |

In Example 2, the Master Batch ingredients were blended in a pre-heated Banbury mixer, and the mixture dumped, cooled and granulated. 67 g of the granulated mixture was banded on a 3 inch electric roll mill, and the Hydral was added in portions to give a uniform mixture; mixing was continued for several more minutes and the mixture was then removed from the mill, cooled, granulated and compression-molded into slabs.

In Example 3, the Master Batch ingredients were blended in a pre-heated Banbury mixer, and the mixture dumped, cooled and granulated. 67 g of the granulated mixture was banded on a 3 inch electric roll mill, and the Hydral was added in portions to give a uniform mixture; mixing was continued for several more minutes and the mixture was then removed from the mill, cooled, granulated and compression-molded into slabs.

In Example 4 the procedure described for Example 2 was followed, using the different ingredients shown in Table 2, except that 50 g. of the granulated Master Batch was used and 50 g. of the filler (Maglite D) added to it.

TABLE 2

| | EXAMPLE 2 | | | | | EXAMPLE 3 | | | EXAMPLE 4 | | | | |
|---|---|---|---|---|---|---|---|---|---|---|---|---|---|
| | Master Batch | | | Final Mix | | Final Mix | | | Master Batch | | | Final Mix | |
| | Wt (g) | Wt % | Vol % | Wt % | Vol % | Wt (g) | Wt % | Vol % | Wt (g) | Wt % | Vol % | Wt % | Vol % |
| Polymer: | | | | | | | | | | | | | |
| Polyethylene (Marlex 6003) | 14.0 | 45.5 | 58.4 | 30.5 | 46.8 | 148.6 | 38.2 | 61.8 | 61 | 61 | 71.3 | 30.5 | 53.3 |
| EPDM Rubber (Epsyn 5508) | 14 | 4.5 | 6.5 | 3.0 | 5.1 | 14.8 | 3.8 | 6.9 | — | — | — | — | — |
| EPDM rubber (Nordel 1440) | — | — | — | — | — | — | — | — | 5 | 5 | 6.6 | 2.5 | 4.9 |
| Carbon Black | | | | | | | | | | | | | |
| Sterling NS | 14.8 | 48.5 | 32.8 | 32.2 | 26.3 | — | — | — | — | — | — | — | — |
| Sterling SO | — | — | — | — | — | 90.6 | 23.3 | 20.1 | — | — | — | — | — |
| Furnex N765 | — | — | — | — | — | — | — | — | 32 | 32 | 20 | 16 | 14.9 |
| Filler | | | | | | | | | | | | | |
| Alumina trihydrate (Hydral 705) | — | — | — | 33 | 20 | — | — | — | — | — | — | — | — |
| Magnesium oxide (Maglite D) | — | — | — | — | — | — | — | — | — | — | — | 50 | 35.2 |
| Zinc oxide (Kadox 15) | — | — | — | — | — | 129.5 | 33.3 | 9.2 | — | — | — | — | — |
| Antioxidant | 6 | 2 | 2.3 | 1.3 | 1.8 | 5.4 | 1.4 | 2.0 | 2 | 2 | 2.1 | 1.0 | 1.7 |

I claim:

1. A conductive polymer composition which has a resistivity at 23° C. of less than $10^6$ ohm-cm and which comprises (1) an organic polymer component which is present in amount 20 to 91% by volume of the composition;

(2) a conductive filler component which consists essentially of carbon black or graphite or a mixture of carbon black and graphite, which has been dispersed in said polymer component and which is present in amount 4 to 65% by volume of the composition; and (3) an arc-controlling additive which is a particulate material and which has been dispersed in said polymer component.

2. A composition according to claim 1 wherein said arc-controlling additive is present in amount 10 to 35% by volume of the composition.

3. A composition according to claim 1 wherein said arc-controlling additive is an inorganic material.

4. A composition according to claim 1 wherein said conductive filler and said arc-controlling additive have a total surface area of at least 1,800 $m^2$ per 100 cc. of said composition.

5. A composition which exhibits PTC behavior, which has a resistivity at 23° C. of less than $10^6$ ohm-cm and which comprises (1) an organic polymer component which is present in amount 20 to 91% by volume of the composition;

(2) a conductive filler component which consists essentially of carbon black or graphite or a mixture of carbon black and graphite, which has been dispersed in said polymer component and which is present in amount 4 to 65% by volume of the composition; and (3) an arc-controlling additive which is a particulate material and which has been dispersed in said polymer component.

6. A composition according to claim 5 in which the conductive filler component comprises carbon black having a particle size, D, which is from 20 to 150 millimicrons and a surface area, S, in $m^2/g$ such that S/D is not more than 10.

7. A composition according to claim 6 which has a resistivity at 23° C. of less than 20 ohm.cm.

8. A composition according to claim 5 wherein the quantity $$\frac{S}{D} \times \frac{\text{(volume of conductive filler + volume of arc-controlling additive)}}{\text{volume of polymer component}}$$

is less than 1.

9. A composition according to claim 5 wherein the polymer component has at least 10% crystallinity.

10. A composition according to claim 9 wherein the polymer component consists essentially of one or more crystalline polymers selected from polyolefins and copolymers of at least one olefin and at least one polar comonomer copolymerisable therewith.

11. A composition according to claim 5 wherein the polymer component comprises at least 75% by weight of polyethylene.

12. A composition according to claim 11 wherein the polymer component consists essentially of polyethylene.

13. A composition according to claim 10 which has been cross-linked to a gel fraction of at least 0.6.

14. An electrical device which comprises (A) a PTC element composed of a conductive polymer composition which exhibits PTC behavior, which has a resistivity at 23° C. of less than $10^6$ ohm.cm, and which comprises (1) an organic polymer component which is present in amount 20 to 91% by volume of the composition and which has at least 10% crystallinity;

(2) a conductive filler component which consists essentially of carbon black, which has been dispersed in said polymer component, and which is present in amount 4 to 65% by volume of the composition; and (3) an arc-controlling additive which is a particulate material and which has been dispersed in said polymer component and (B) at least two electrodes which can be connected to a source of electrical power and which when so connected cause current to flow through the PTC element.

15. A device according to claim 14 wherein the composition has been melt-extruded.

16. A device according to claim 14 wherein said arc-controlling additive is present in amount 10 to 35% by volume of the composition.

17. A device according to claim 14 in which the conductive filler component comprises carbon black having a particle size, D, which is from 20 to 150 millimicrons and a surface area, S, in $m^2/g$ such that S/D is not more than 10.

18. A device according to claim 17 wherein the conductive polymer has a resistivity at 23° C. of less than 20 ohm.cm., and wherein the quantity $$\frac{S}{D} \times \frac{\text{(volume of conductive filler + volume of arc-controlling additive)}}{\text{volume of polymer component}}$$

is less than 1.

19. A device according to claim 18 wherein the polymer component consists essentially of one or more crystalline polymers selected from polyolefins and copolymers of at least one olefin and at least one polar comonomer copolymerisable therewith.

20. A device according to claim 14 wherein the conductive polymer has been cross-linked to a gel fraction of at least 0.6.

* * * * *

UNITED STATES PATENT AND TRADEMARK OFFICE
CERTIFICATE OF CORRECTION

PATENT NO. : 5,178,797 Page 1 of 3

DATED : January 12, 1993

INVENTOR(S) : Joseph H. Evans

It is certified that error appears in the above-indentified patent and that said Letters Patent is hereby corrected as shown below:

Cover Page, Inventor [75], after "Joseph H. Evans, Palo Alto, Calif.", insert --; Lester Tungnan Toy, Fremont, Calif.--.

Column 1, line 25, replace "(PIC)" by --(PTC)--.

Column 1, line 40, delete "now abandoned,".

Column 1, line 42, after "(Horsma)," insert --now abandoned,--.

Column 1, line 43, after "Konynenburg et al.)," insert --now U.S. Pat. No. 4,237,441,--.

Column 1, lines 43 to 44, after "965,344," delete "now U.S. Pat. No. 4,237,441".

Column 1, line 44, after "(Middleman et al.)," insert --now U.S. Pat. No. 4,238,812,--.

UNITED STATES PATENT AND TRADEMARK OFFICE
CERTIFICATE OF CORRECTION

PATENT NO. : 5,178,797

DATED : January 12, 1993

INVENTOR(S) : Joseph H. Evans

It is certified that error appears in the above-indentified patent and that said Letters Patent is hereby corrected as shown below:

Column 1, line 44, after "965,345" insert --(Middleman et al.),--.

Column 1, line 45, after "4,242,573," delete "Middleman et al.),".

Column 1, line 45, after "6,773" insert --(Simon),--.

Column 1, line 46, after "4,255,698" delete "(Simon)".

Column 1, line 46, after "75,413" insert --"(Van Konynenburg),--.

Column 1, line 47, delete "(Van Konynenburg)".

Column 2, line 64, replace "at lease" by --at least--.

Column 3, line 7, replace "4,219,607 and" by --4,219,607,--.

UNITED STATES PATENT AND TRADEMARK OFFICE

CERTIFICATE OF CORRECTION

PATENT NO. : 5,178,797

DATED : January 12, 1993

INVENTOR(S) : Joseph H. Evans

It is certified that error appears in the above-indentified patent and that said Letters Patent is hereby corrected as shown below:

Column 3, line 7, replace "869,268" by --869,268,--.

Column 3, line 7, replace "4,223,071" by --4,223,071,--.

Column 3, line 8, after "869,269" insert --, now--.

Column 3, line 12, replace "abandoned" by --abandoned,--.

Column 3, line 24, replace "4,237,444." by --4,237,441.--

Column 6,
Claim 14, line 10, after "carbon black" insert --or graphite or a mixture of carbon black and graphite--.

Claim 14, line 16, replace "component" by --component;--.

Signed and Sealed this

Twentieth Day of December, 1994

*Attest:*

Bruce Lehman

BRUCE LEHMAN

*Attesting Officer* *Commissioner of Patents and Trademarks*

US005178797C1

(12) EX PARTE REEXAMINATION CERTIFICATE (5285th)

United States Patent

(10) Number: US 5,178,797 C1

Evans et al.

(45) Certificate Issued: *Mar. 7, 2006

(54) CONDUCTIVE POLYMER COMPOSITIONS HAVING IMPROVED PROPERTIES UNDER ELECTRICAL STRESS

(75) Inventors: Joseph H. Evans, Palo Alto, CA (US); Lester Tungnan Toy, Fremont, CA (US)

(73) Assignee: Tyco Electronics Corporation, Middletown, PA (US)

Reexamination Request:
No. 90/006,457, Nov. 20, 2002

Reexamination Certificate for:

| | |
|---|---|
| Patent No.: | **5,178,797** |
| Issued: | **Jan. 12, 1993** |
| Appl. No.: | **07/757,156** |
| Filed: | **Sep. 16, 1991** |

( * ) Notice: This patent is subject to a terminal disclaimer.

Certificate of Correction issued Dec. 20, 1994.

Related U.S. Application Data

(63) Continuation of application No. 07/617,444, filed on Nov. 21, 1990, now Pat. No. 5,049,850, which is a continuation of application No. 06/141,989, filed on Apr. 21, 1980, now abandoned.

(51) Int. Cl.
*C08K 3/04* (2006.01)

(52) U.S. Cl. ........................................ 252/508; 252/510

(58) Field of Classification Search ................. 252/508, 252/509, 510, 511, 518.1; 338/22 R, 22 SD
See application file for complete search history.

(56) References Cited

U.S. PATENT DOCUMENTS

| | | | |
|---|---|---|---|
| 3,673,121 | A | 6/1972 | Meyer |
| 3,861,029 | A | 1/1975 | Smith-Johannsen |
| 3,976,600 | A | 8/1976 | Meyer |
| 4,002,595 | A | 1/1977 | Adelman |
| 4,151,126 | A | 4/1979 | Adelman et al. |
| 4,237,441 | A | 12/1980 | van Konynenburg |
| 4,534,889 | A | 8/1985 | van Konynenburg et al. |
| 5,049,850 | A | 9/1991 | Evans |

FOREIGN PATENT DOCUMENTS

| | | |
|---|---|---|
| FR | 1207401 | 2/1960 |
| GB | 831490 | 3/1960 |
| GB | 1041503 | 9/1966 |
| GB | 1185473 | 3/1970 |
| GB | 1369210 | 10/1974 |
| GB | 1444722 | 8/1976 |
| GB | 1549757 | 8/1979 |
| GB | 2018780 | 10/1979 |
| GB | 2036754 | 7/1980 |
| JP | 5514690 | 8/1970 |
| JP | 5136876 | 12/1972 |
| JP | 51-41041 | 4/1976 |
| JP | 51-79140 | 9/1976 |

*Primary Examiner*—Mark Kopec

(57) ABSTRACT

Conductive polymer compositions comprise carbon black or graphite dispersed in a polymer and further comprise an arc-controlling additive such as alumina hydrate. Such compositions have improved performance when subjected to electrical stress and are, therefore, particularly useful in circuit protection devices.

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 2–4, 7, 9, 16 and 20 are cancelled.

Claims 1, 5, 10, 14 and 18 are determined to be patentable as amended.

Claims 6, 8, 11–13, 15, 17 and 19, dependent on an amended claim, are determined to be patentable.

1. A conductive polymer composition which has a resistivity at 23° C. of less than [$10^6$] *20* ohm-cm and which comprises*:*

(1) an organic polymer component which is present in amount 20 to 91% by volume of the composition;

(2) a conductive filler component which consists essentially of carbon black or graphite or a mixture of carbon black and graphite, which has been dispersed in said polymer component and which is present in amount 4 to 65% by volume of the composition; and (3) an arc-controlling additive which is [a] *an inorganic* particulate material *present in amount 10 to 35% by volume of the composition* and which has been dispersed in said polymer component*, wherein the arc-controlling additive is effective to control arcs within a mass of the composition, and wherein said conductive filler and said arc-controlling additive have a total surface area of at least 1,800 $m^2$ per 100 cc. of said composition*.

5. A composition which exhibits PTC behavior, which has a resistivity at 23° C. of less than [$10^6$] *20* ohm-cm and which comprises*:*

(1) an organic polymer component which is present in amount 20 to 91% by volume of the composition*, wherein the organic polymer component has at least 10% crystallinity*;

(2) a conductive filler component which consists essentially of carbon black or graphite or a mixture of carbon black and graphite, which has been dispersed in said polymer component and which is present in amount 4 to 65% by volume of the composition; and (3) an arc-controlling additive which is [a] *an inorganic* particulate material *present in amount 10 to 35% by volume of the composition* and which has been dispersed in said polymer component*, wherein the arc-controlling additive is effective to control arcs within a mass of the composition*.

10. A composition according to claim [9] *5* wherein the polymer component consists essentially of one or more crystalline polymers selected from polyolefins and copolymers of at least one olefin and at least one polar comonomer copolymerisable therewith.

14. An electrical device which comprises*:*

(A) a PTC element composed of a conductive polymer composition which exhibits PTC behavior, which has a resistivity at 23° C. of less than [$10^6$] *20* ohm[.]-cm, and which comprises*:*

(1) an organic polymer component which is present in amount 20 to 91% by volume of the composition and which has at least 10% crystallinity;

(2) a conductive filler component which consists essentially of carbon black or graphite or a mixture of carbon black and graphite, which has been dispersed in said polymer component, and which is present in amount 4 to 65% by volume of the composition; and (3) an arc-controlling additive which is [a] *an inorganic* particulate material *present in amount 10 to 35% by volume of the composition* and which has been dispersed in said polymer component*, wherein the arc-controlling additive is effective to control arcs within a mass of the composition, and wherein the conductive polymer has been cross-linked to a gel fraction of at least 0.6*; and (B) at least two electrodes which can be connected to a source of electrical power and which when so connected cause current to flow through the PTC element.

18. A device according to claim 17 [wherein the conductive polymer has a resistivity at 23° C. of less than 20 ohm.cm., and] wherein the quantity $$\frac{S}{D} \times \frac{(\text{volume of conductive filler} + \text{volume of arc-controlling additive})}{\text{volume of polymer component}}$$

is less than 1.

* * * * *